(12) United States Patent
Wong

(10) Patent No.: US 8,665,221 B2
(45) Date of Patent: Mar. 4, 2014

(54) METHOD AND APPARATUS FOR INPUTTING CHINESE CHARACTERS

(75) Inventor: Kwok Lung Wong, Hong Kong (HK)

(73) Assignee: Future Bright International Limited, Hong Kong (HK)

(*) Notice: Subject to any disclaimer, the term of this patent is extended or adjusted under 35 U.S.C. 154(b) by 281 days.

(21) Appl. No.: 13/151,277

(22) Filed: Jun. 2, 2011

(65) Prior Publication Data

US 2011/0298719 A1 Dec. 8, 2011

(30) Foreign Application Priority Data

Jun. 8, 2010 (HK) .................................. 10105639.4

(51) Int. Cl.
*G06F 3/02* (2006.01)
*G09G 5/00* (2006.01)

(52) U.S. Cl.
USPC .............................................. 345/171; 704/1

(58) Field of Classification Search
USPC .......................................................... 345/171
See application file for complete search history.

(56) References Cited

U.S. PATENT DOCUMENTS 6,947,771 B2 * 9/2005 Guo et al. ...................... 455/566

FOREIGN PATENT DOCUMENTS

| CN | 1379310 | 11/2002 |
| CN | 1388696 | 1/2003 |
| CN | 1460913 | 12/2003 |
| CN | 1554994 | 12/2004 |
| CN | 1554994 A | * 12/2004 |

OTHER PUBLICATIONS

International Search Report of PCT Application No. PCT/CN2011/075126.
Search Report of Hong Kong Short Term Patent Application No. 1141403A.

* cited by examiner

*Primary Examiner* — Kevin M Nguyen
*Assistant Examiner* — Kenneth B Lee, Jr.

(57) ABSTRACT

A method for inputting Chinese characters to an electronic device is provided. The electronic device includes a plurality of numeric input keys for inputting numeric numbers and a plurality of control keys for navigation, selection, and editing. The method includes decomposing a Chinese character into a plurality of character elements based on the structure of the character; identifying a plurality of Chinese number characters respectively corresponding to the character elements based on a first mapping; identifying a plurality of numeric input keys respectively corresponding to the Chinese number characters based on a second mapping; pressing the identified numeric input keys in a predetermined order; navigating to the wanted candidate in a list of character candidates with at least one of the control keys; selecting the wanted candidate with at least one of the control keys; and correcting any error made in the other steps with at least one of the control keys. The first mapping is based on the similarity in the shapes between the character elements and the Chinese number characters. The second mapping is essentially based on the meaning of the Chinese number characters. An apparatus for inputting Chinese characters is also provided.

20 Claims, 3 Drawing Sheets

| 1 一 | 2 二 | 3 三 |
|---|---|---|
| 4 四 | 5 五 | 6 六 |
| 7 七 | 8 八 | 9 九 |
| * | 0 十 | # |

FIG. 1

| 1 一 | 2 二 | 3 三 | 4 四 | 5 五 | 6 六 | 7 七 | 8 八 | 9 九 | 0 十 |
|---|---|---|---|---|---|---|---|---|---|

FIG. 2

| Arabic Numbers | Chinese Number Characters | Character Elements | | | | | |
|---|---|---|---|---|---|---|---|
| 1 | 一 | 一 | 丶 | | | | |
| 2 | 二 | 丶 | 乂 | 二 | 二 | | |
| 3 | 三 | 三 | 三 | 彡 | 八 | 彡 | |
| 4 | 四 | 口 | 口 | 口 | 口 | 𠃍 | 川 |
| 5 | 五 | 𠃍 | 𠃌 | 亅 | 一 | 丁 | |
| 6 | 六 | 丷 | 一 | 丶 | 丶 | 丶 | 亠 |
| 7 | 七 | 十 | 十 | 七 | 𠃋 | 丁 | 乚 |
| 8 | 八 | 八 | 八 | 丨 | 丿 | 乚 | |
| 9 | 九 | 丿 | ㇆ | 乚 | 𠃍 | | |
| 0 | 十 | 十 | 乂 | 十 | | | |

| Character Elements | 口 | 十 | 口 | ナ | 乂 | ノ | 一 | 乂 |
|---|---|---|---|---|---|---|---|---|
| Chinese Number Characters | 四 | 十 | 四 | 十 | 十 | 八 | 一 | 十 |

碼

| Character Elements | 一 | ノ | 口 | 匚 | 二 | 丨 | 乚 | 灬 |
|---|---|---|---|---|---|---|---|---|
| Chinese Number Characters | 一 | 八 | 四 | 四 | 二 | 一 | 七 | 四 |

中

| Character Elements | 口 | 丨 |
|---|---|---|
| Chinese Number Characters | 四 | 一 |

文

| Character Elements | 亠 | 乂 |
|---|---|---|
| Chinese Number Characters | 六 | 十 |

輸

| Character Elements | 十 | 口 | 一 | 一 | 人 | 一 | 冂 | 二 | 刂 |
|---|---|---|---|---|---|---|---|---|---|
| Chinese Number Characters | 十 | 四 | 一 | 一 | 八 | 一 | 四 | 二 | 二 |

FIG. 4

METHOD AND APPARATUS FOR INPUTTING CHINESE CHARACTERS

CROSS REFERENCE TO RELATED APPLICATION

The present patent application claims priority of Hong Kong patent application No. 10105639.4 filed on Jun. 8, 2010, the entire content of which is hereby incorporated by reference.

FIELD OF THE PATENT APPLICATION

The present patent application generally relates to a text input apparatus and method and more specifically to a method and an apparatus for inputting Chinese characters.

BACKGROUND

Over the years, there have been numerous Chinese input methods. Some of these Chinese input methods require a user to know the pronunciation of the character to be input with certain degree of accuracy. The user is then required to press the keys corresponding to the pronunciation and choose from a list of character candidates. However, due to the fact that there are a variety of dialects used by people speaking Chinese besides the standard mandarin and the standard Cantonese, an inaccurate pronunciation often leads to a long list of character candidates and reduced efficiency of inputting Chinese characters, not to mention there are a large number of characters having the same pronunciation. In some cases, the user may not know the pronunciation of a character at all, which makes it impossible for her/him to input this character with above methods.

Some other Chinese input methods require the user to memorize a detailed mapping between elements of Chinese characters and a full set of alphabet keys and to decompose a character with the mapped alphabet keys in order to input the character. More often than not, such an input method requires the user to spend a lot of time memorizing the aforementioned detailed mapping and practicing using it before the user can use the input method to input Chinese characters proficiently.

SUMMARY

The present patent application is directed to a method and an apparatus for inputting Chinese characters. In one aspect, the present patent application provides a method for inputting Chinese characters to an electronic device. The electronic device includes a plurality of numeric input keys for inputting numeric numbers and a plurality of control keys for navigation, selection, and editing. The method includes: decomposing a Chinese character into a plurality of character elements based on the structure of the character; identifying a plurality of Chinese number characters respectively corresponding to the character elements based on a first mapping; identifying a plurality of numeric input keys respectively corresponding to the Chinese number characters based on a second mapping; pressing the identified numeric input keys in a predetermined order; navigating to the wanted candidate in a list of character candidates with at least one of the control keys; selecting the wanted candidate with at least one of the control keys; and correcting any error made in the other steps with at least one of the control keys. The first mapping is based on the similarity in the shapes between the character elements and the Chinese number characters. The second mapping is essentially based on the meaning of the Chinese number characters.

The step of pressing the identified numeric input keys may include pressing the identified numeric input keys based on the order of how the character is written.

The candidate list may include characters that include more character elements than the character elements corresponding to the numeric input keys having been pressed. The wanted candidate may be selected before all of the identified numeric input keys are pressed. The wanted candidate may be the only candidate in the candidate list when being selected as the input.

The candidate list may exclude characters that include more character elements than the character elements corresponding to the numeric input keys having been pressed.

In another aspect, the present patent application provides an electronic apparatus for inputting Chinese characters. The electronic apparatus includes: a plurality of numeric input keys configured to be pressed by a user to create a candidate list of character candidates; and a plurality of control keys for navigation, selection, and editing, at least one of the control keys being configured to navigate the user within the candidate list, at least one of the control keys being configured for the user to select the wanted candidate, at least one of the control keys being configured to correct any error made by the user. The numeric input keys respectively correspond to a plurality of Chinese number characters based on a first mapping. Each of the Chinese number characters corresponds to a plurality of character elements based on a second mapping. A combination of the character elements corresponding to the pressed numeric input keys constitutes at least a portion of any character candidate in the candidate list. The first mapping is based on the similarity in the shapes between the character elements and the Chinese number characters. The second mapping is essentially based on the meaning of the Chinese number characters.

The combination of the character elements may be in accordance with the order of how the character candidates are written.

The combination of the character elements corresponding to the pressed numeric input keys may partially constitute a portion of the character candidates in the candidate list. The at least one of the control keys being configured to select the wanted candidate may be configured to be used to select the wanted candidate when the combination of the character elements corresponding to the pressed numeric input keys partially constitutes the wanted candidate.

The wanted candidate may be the only candidate in the candidate list when being selected as the input.

The combination of the character elements corresponding to the pressed numeric input keys may fully constitute any character candidate in the candidate list.

In yet another aspect, the present patent application provides a Chinese input method used for an electronic device. The electronic device includes a plurality of numeric input keys for inputting numeric numbers. The method includes: decomposing a Chinese character into a plurality of character elements based on the structure of the character; identifying a plurality of Chinese number characters respectively corresponding to the character elements based on a first mapping; identifying a plurality of numeric input keys respectively corresponding to the Chinese number characters based on a second mapping; pressing the identified numeric input keys in a predetermined order to generate a list of character candidates; and selecting a wanted candidate from the list of character candidates. The first mapping is based on the similarity in the shapes between the character elements and the Chinese number characters. The second mapping is essentially based on the meaning of the Chinese number characters.

The method may further include the step of configuring whether the candidate list includes or excludes characters that include more character elements than the character elements corresponding to the numeric input keys having been pressed.

BRIEF DESCRIPTIONS OF THE DRAWINGS

FIG. 1 shows the diagram of a key pattern of an apparatus for inputting Chinese characters according to an embodiment of the present patent application.

FIG. 2 shows the diagram of a key pattern of another apparatus for inputting Chinese characters according to another embodiment of the present patent application.

FIG. 3 shows the mapping between the Chinese number characters and a plurality of character elements for composing Chinese characters according to another embodiment of the present patent application.

FIG. 4 illustrates five examples of inputting Chinese characters with the method for inputting Chinese characters according to another embodiment of the present patent application.

DETAILED DESCRIPTION

Reference will now be made in detail to a preferred embodiment of the method and the apparatus for inputting Chinese characters disclosed in the present patent application, examples of which are also provided in the following description. Exemplary embodiments of the method and the apparatus for inputting Chinese characters disclosed in the present patent application are described in detail, although it will be apparent to those skilled in the relevant art that some features that are not particularly important to an understanding of the method and the apparatus for inputting Chinese characters may not be shown for the sake of clarity.

Furthermore, it should be understood that the method and the apparatus for inputting Chinese characters disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

FIG. 1 shows the diagram of a key pattern of an apparatus for inputting Chinese characters according to an embodiment of the present patent application. The key pattern in FIG. 1 is suitable to be used with the dial pad of a phone. FIG. 2 shows the diagram of a key pattern of another apparatus for inputting Chinese characters according to another embodiment of the present patent application. The key pattern in FIG. 2 is suitable to be used with the keyboard of a computer. Referring to FIG. 1 and FIG. 2, the patterns show the following mapping:
1: 一 (the Chinese character meaning "one")
2: 二 (the Chinese character meaning "two")
3: 三 (the Chinese character meaning "three")
4: 四 (the Chinese character meaning "four")
5: 五 (the Chinese character meaning "five")
6: 六 (the Chinese character meaning "six")
7: 七 (the Chinese character meaning "seven")
8: 八 (the Chinese character meaning "eight")
9: 九 (the Chinese character meaning "nine")
0: 十 (the Chinese character meaning "ten")

The above mapping is intuitive to a user and considerably easy for the user to memorize because the meaning of the mapped Chinese number characters essentially correspond to the Arabic numbers printed on the dial pad of the phone or the keyboard of the computer. These mapped Chinese number characters (meaning "one" through "ten") can be further mapped to a plurality of character elements for composing any Chinese character to be input to the phone or the computer, which will be described in detail hereafter.

It is noted that although a phone dial pad and a computer keyboard are illustrated in the above embodiments, the aforementioned mapping can be applied to any electronic device that has any type of numeric keyboards as the apparatus for inputting Chinese characters.

FIG. 3 shows the mapping between the Chinese number characters and a plurality of character elements for composing Chinese characters according to another embodiment of the present patent application. Referring to FIG. 3, each of the Chinese number characters is similar in shape to the character elements that this Chinese number character maps to. For example, the Chinese number Character 四, which corresponds to the Arabic number "4", maps to the following character elements:

囗, 冂, 匚, 彐, 刂, 冖, ⺍

These character elements have similar shapes as the Chinese number character "四". Such similarities allow a user to memorize the mapping relatively easily. The total number of Chinese number characters is ten, which is substantially smaller than the total number of English alphabets (26), so that the amount of information the user needs to memorize in order to use the Chinese character input method according to this embodiment is much smaller than the conventional Chinese input methods based on the structure of the characters.

FIG. 4 illustrates five examples of inputting Chinese characters with the method for inputting Chinese characters according to another embodiment of the present patent application. Referring to FIG. 4, for example, when a user wants to input the Chinese character "數", the user first decompose the character to a number of character elements based on the structure of the character:

囗, 十, 囗, 丿, ㄨ, 丿, 一, ㄨ.

Based on the similarities in the shapes, the user can easily map these character elements to the following corresponding Chinese number characters respectively:

四, 十, 四, 十, 十, 八, 一, 十, based on the mapping illustrated in FIG. 3.

The user can press the numeric keys printed with the following Arabic numbers that correspond to the above Chinese number characters:

4, 0, 4, 0, 0, 8, 1, 0, based on the mapping illustrated in FIG. 1 and FIG. 2.

The aforementioned decomposition and mapping process for the Chinese characters "碼", "中", "文", and "輸" are also illustrated in FIG. 4.

It is noted that preferably in the above process, the user decompose the character to be input into the character elements following the order of how the character is written. Alternatively, the user may decompose the character not necessarily following such order.

There may be some cases in which a number of characters correspond to the same combination of numeric key inputs. For example, a number of characters may all include a few character elements at the beginning in common. In such cases, the characters that include these common character elements will appear in a candidate list for the user to choose from. In other words, the electronic device is configured in a way that the candidate list includes characters that include more character elements than the character elements corresponding to the numeric input keys having been pressed.

When the user presses the numeric keys, it is likely that a particular character can be identified, selected and successfully input to the electronic device only after a first few but not all of the numeric keys resulted from the decomposition are pressed. In other words, the wanted candidate may be selected when the combination of the character elements corresponding to the pressed numeric input keys partially constitutes the wanted candidate. In some cases, the information carried by the first few numeric keys may be sufficient already to identify the character to be input in the database implemented in the electronic device. In other words, the wanted character candidate may be the only candidate in the candidate list when being selected as the input.

In an alternative embodiment, the electronic device can be configured by the user to assume the user always wants to press the complete combination of the numeric keys resulted from the decomposition and does not display the character candidates that include any more character elements than the ones that have been typed in.

In the above embodiments, when browsing the character candidates, the user may press a "Space" key (as a navigation key) to turn to the next available character candidate in the candidate list, and press a "Enter" key (as a selection key) to select the wanted candidate. After the wanted candidate is selected and successfully input to the electronic device, the user can proceed to input the next character immediately. If an error is made during typing the numeric keys or selecting the wanted candidate, the user can press a "Backspace" key or "Delete" key (as an editing key) to undo the error. It is understood that according to the specific hardware configurations, the electronic device may include a plurality of control keys compatible with the specific hardware for navigation, selection and editing functions to carry out the above tasks.

When using the method for inputting Chinese characters according to the above embodiments, the user does not need to use the alphabet keyboards at all and does not need to memorize the mapping between the character elements and the large number of alphabet keys. The mapping that the user needs to be familiar with between the Chinese number characters and the character elements are based on the similarities in the shapes and thus easy to be learned and memorized by the user. In addition, with the method provided by the embodiments, the number of character candidates for a particular combination of numeric key inputs is relatively small, especially when a relatively high percentage of the result of the decomposition is typed in, which saves the user's time of browsing the available character candidates and selecting the wanted one. Further, both simplified Chinese characters and traditional Chinese characters can be input with the method provided by the embodiments.

While the present patent application has been shown and described with particular references to a number of embodiments thereof, it should be noted that various other changes or modifications may be made without departing from the scope of the present invention.

What is claimed is:

1. A method for inputting Chinese characters to an electronic device, the electronic device comprising a plurality of numeric input keys for inputting numeric numbers and a plurality of control keys for navigation, selection, and editing, the method comprising:
   decomposing a Chinese character into a plurality of character elements based on the structure of the character;
   identifying a plurality of Chinese number characters respectively corresponding to the character elements based on a first mapping;
   identifying a plurality of numeric input keys respectively corresponding to the Chinese number characters based on a second mapping;
   pressing the identified numeric input keys in a predetermined order;
   navigating to the wanted candidate in a list of character candidates with at least one of the control keys;
   selecting the wanted candidate with at least one of the control keys; and
   correcting any error made in the other steps with at least one of the control keys; wherein:
   the first mapping is based on the similarity in the shapes between the character elements and the Chinese number characters; and
   the second mapping is essentially based on the meaning of the Chinese number characters; wherein the first mapping is as follows:

| Arabic Numbers | Chinese Number Characters | Character Elements |
|---|---|---|
| 1 | 一 | 一 丨 丿 |
| 2 | 二 | 丶 丨 二 刂 |
| 3 | 三 | 三 川 彡 氵 爻 八 冫 |
| 4 | 四 | 囗 凵 冂 匚 口 冖 灬 |
| 5 | 五 | 五 ㇋ ㄥ ㄣ 工 丁 |
| 6 | 六 | 亠 ㇀ 亻 忄 ㄅ 丿 匕 ㇏ |
| 7 | 七 | 土 士 小 丶 ㇉ 丿 寸 |
| 8 | 八 | 八 丿 人 乀 |
| 9 | 九 | 九 大 ㄱ 厂 丆 ㄋ |
| 0 | 十 | 十 乂 ⺀ |

2. The method for inputting Chinese characters of claim 1, wherein the step of pressing the identified numeric input keys comprises pressing the identified numeric input keys based on the order of how the character is written.

3. The method for inputting Chinese characters of claim 1, wherein the candidate list comprises characters that comprise more character elements than the character elements corresponding to the numeric input keys having been pressed.

4. The method for inputting Chinese characters of claim 3, wherein the wanted candidate is selected before all of the identified numeric input keys are pressed.

5. The method for inputting Chinese characters of claim 4, wherein the wanted candidate is the only candidate in the candidate list when being selected as the input.

6. The method for inputting Chinese characters of claim 1, wherein the candidate list excludes characters that comprise more character elements than the character elements corresponding to the numeric input keys having been pressed.

7. An electronic apparatus for inputting Chinese characters comprising:
   a plurality of numeric input keys configured to be pressed by a user to create a candidate list of character candidates; and
   a plurality of control keys for navigation, selection, and editing, at least one of the control keys being configured to navigate the user within the candidate list, at least one of the control keys being configured for the user to select the wanted candidate, at least one of the control keys being configured to correct any error made by the user; wherein:

the numeric input keys respectively correspond to a plurality of Chinese number characters based on a first mapping;
each of the Chinese number characters corresponds to a plurality of character elements based on a second mapping;
a combination of the character elements corresponding to the pressed numeric input keys constitutes at least a portion of any character candidate in the candidate list;
the first mapping is based on the similarity in the shapes between the character elements and the Chinese number characters; and
the second mapping is essentially based on the meaning of the Chinese number characters;
wherein the first mapping is as follows:

| Arabic Numbers | Chinese Number Characters | Character Elements |
| --- | --- | --- |
| 1 | 一 | 一 丨 ⼂ |
| 2 | 二 | 冫 ⼎ ⼍ ⼑ |
| 3 | 三 | 三 川 彡 ⼎ ⼎ 八 3 |
| 4 | 四 | 囗 凵 冂 匚 冖 ⼎ ⺍ |
| 5 | 五 | 𠃍 乚 匚 コ ㄒ |
| 6 | 六 | 亠 ⼧ ⼍ ⼷ ⼧ ⼎ ⺀ ⼎ |
| 7 | 七 | 一 ⼓ ⼏ ⼂ ⼂ ⼏ ㇏ |
| 8 | 八 | 八 ノ 入 ⺄ |
| 9 | 九 | ⼌ ⼗ ⼙ ⼓ ⼛ |
| 0 | 十 | 十 乂 乂. |

8. The electronic apparatus for inputting Chinese characters of claim 7, wherein the combination of the character elements is in accordance with the order of how the character candidates are written.

9. The electronic apparatus for inputting Chinese characters of claim 7, wherein the combination of the character elements corresponding to the pressed numeric input keys partially constitutes a portion of the character candidates in the candidate list.

10. The electronic apparatus for inputting Chinese characters of claim 9, wherein the at least one of the control keys being configured to select the wanted candidate is configured to be used to select the wanted candidate when the combination of the character elements corresponding to the pressed numeric input keys partially constitutes the wanted candidate.

11. The electronic apparatus for inputting Chinese characters of claim 10, wherein the wanted candidate is the only candidate in the candidate list when being selected as the input.

12. The electronic apparatus for inputting Chinese characters of claim 7, wherein the combination of the character elements corresponding to the pressed numeric input keys fully constitutes any character candidate in the candidate list.

13. A Chinese input method used for an electronic device, the electronic device comprising a plurality of numeric input keys for inputting numeric numbers, the method comprising:
decomposing a Chinese character into a plurality of character elements based on the structure of the character;
identifying a plurality of Chinese number characters respectively corresponding to the character elements based on a first mapping;
identifying a plurality of numeric input keys respectively corresponding to the Chinese number characters based on a second mapping;
pressing the identified numeric input keys in a predetermined order to generate a list of character candidates; and
selecting a wanted candidate from the list of character candidates; wherein:
the first mapping is based on the similarity in the shapes between the character elements and the Chinese number characters; and
the second mapping is essentially based on the meaning of the Chinese number characters;
wherein the first mapping is as follows:

| Arabic Numbers | Chinese Number Characters | Character Elements |
| --- | --- | --- |
| 1 | 一 | 一 丨 ⼂ |
| 2 | 二 | 冫 ⼎ ⼍ ⼑ |
| 3 | 三 | 三 川 彡 ⼎ ⼎ 八 3 |
| 4 | 四 | 囗 凵 冂 匚 冖 ⼎ ⺍ |
| 5 | 五 | 𠃍 乚 匚 コ ㄒ |
| 6 | 六 | 亠 ⼧ ⼍ ⼷ ⼧ ⼎ ⺀ ⼎ |
| 7 | 七 | 一 ⼓ ⼏ ⼂ ⼂ ⼏ ㇏ |
| 8 | 八 | 八 ノ 入 ⺄ |
| 9 | 九 | ⼌ ⼗ ⼙ ⼓ ⼛ |
| 0 | 十 | 十 乂 乂. |

14. The method for inputting Chinese characters of claim 13, wherein the step of pressing the identified numeric input keys comprises pressing the identified numeric input keys based on the order of how the character is written.

15. The method for inputting Chinese characters of claim 13, wherein the candidate list comprises characters that comprise more character elements than the character elements corresponding to the numeric input keys having been pressed.

16. The method for inputting Chinese characters of claim 15, wherein the wanted candidate is selected before all of the identified numeric input keys are pressed.

17. The method for inputting Chinese characters of claim 16, wherein the wanted candidate is the only candidate in the candidate list when being selected as the input.

18. The method for inputting Chinese characters of claim 13, wherein the candidate list excludes characters that comprise more character elements than the character elements corresponding to the numeric input keys having been pressed.

19. The method for inputting Chinese characters of claim 13, wherein the electronic device further comprises a key for navigation and a key for selection, and the Chinese input method further comprises navigating to the wanted candidate with the key for navigation and selecting the wanted candidate with the key for selection.

20. The method for inputting Chinese characters of claim 13 further comprising the step of configuring whether the candidate list comprises or excludes characters that comprise more character elements than the character elements corresponding to the numeric input keys having been pressed.

* * * * *